2,915,566

PROCESS FOR PREPARING METHYL MAGNESIUM COMPOUNDS BY REACTING DIMETHYL SULFATE WITH MAGNESIUM

Henri Normant, Paris, and Patrice Perrin, Lyon, France, assignors to Societe des Usines Chimiques Rhone-Poulenc, Paris, France, a corporation of France No Drawing. Application November 29, 1957
Serial No. 699,534

Claims priority, application France December 6, 1956

9 Claims. (Cl. 260—665)

This invention relates to the preparation of methylmagnesium compounds.

Methylmagnesium compounds prepared from a methyl halide and magnesium are well known in the art. Dimethyl sulphate, however, does not give satisfactory results in the usual method for the preparation of Grignard reagents. For example Suter and Gerhart (Journal of the American Chemical Society, vol. 57, p. 107 (1935)) reacted dialkyl sulphates with magnesium in boiling ether in the presence of a large excess of iodine (1 atom per 5 atoms of magnesium). Under these conditions, with dimethyl sulphate they obtained dimethylmagnesium in a yield of 28% together with a large quantity of gaseous products, mainly consisting of ethane, the formation of which is due to a secondary reaction of dimethyl sulphate with dimethylmagnesium.

It has now been unexpectedly found that it is possible to obtain good yields of methylmagnesium compounds if the reaction between dimethyl sulphate and magnesium is carried out in a solvent of the cyclic ether or polyether type.

According to the present invention, therefore, a process for the production of methylmagnesium compounds comprises reacting under substantially anhydrous conditions dimethyl sulphate with magnesium at a low temperature, in a solvent in the form of tetrahydrofuran, tetrahydropyran, or a homologue of either, or in the form of a polyethylene glycol ether of the general formula:

$$R(OCH_2CH_2)_nOR'$$

wherein R and R' represent the same or different alkyl groups, and $n$ is an integer.

In the preferred form of the reaction, the temperature of the mixture is kept below 25° C., preferably between 18° and 20° C. When polyethylene glycol ethers are used as solvents, those ethers in which R and R' each contain not more than 4 carbon atoms and $n$ is 2 or 3 are preferred.

The process of the invention favours the substitution of dimethyl sulphate for the methyl halides which up to the present have been solely utilised for the preparation of magnesium derivatives, and it gives similar or even superior yields. Dimethyl sulphate is less expensive than methyl bromide and iodide. It is liquid at room temperature, while methyl chloride and bromide are gaseous, and is consequently more convenient in that it renders possible operation at atmospheric pressure without requiring pressure-resisting apparatus or a complicated recovery plant.

The reaction is performed in the same manner as for an ordinary Grignard reagent, i.e. in dry apparatus and with dry reactants and in a current of dry nitrogen. The magnesium charge is covered with the solvent and is generally activated by the addition of an iodine crystal. In the presence of iodine, the reaction with dimethyl sulphate starts immediately at room temperature. The addition of dimethyl sulphate is controlled and external cooling is applied to maintain a temperature of 18–20° C. It is advantageous to utilise a slight excess of magnesium over the theoretical quantity. Under these conditions all the dimethyl sulphate is consumed in the reaction and the evolution of gas is insignificant, which shows that the secondary reactions of decomposition are very slight.

The product of the reaction is a mixture of dimethylmagnesium, methylmagnesium methyl sulphate, and magnesium methyl sulphate. The latter is insoluble in the solvents used. Both dimethylmagnesium and methylmagnesium methyl sulphate behave like Grignard reagents in their ordinary reactions and may be used instead of them.

The yield obtained by the procedure herein disclosed, calculated both on the magnesium and the dimethyl sulphate used, exceeds 90% of the theoretical value. This yield indicates the sum of active methyl radicals in the dimethylmagnesium and the methylmagnesium methyl sulphate in the form of carbon-magnesium linkages. It is established by alcalimetric determination after hydrolysis by water of the carbon-magnesium linkages.

The dimethylmagnesium is formed from the methylmagnesium methyl sulphate with concomitant precipitation of magnesium methyl sulphate, which is insoluble in the solvents utilised and which can be separated by decantation or filtration. In this way it is possible to obtain a clear solution containing only magnesium in the form of dimethylmagnesium and methylmagnesium methylsulphate, with the exclusion of magnesium methylsulphate, and this makes possible the calculation of the relative proportions of dimethylmagnesium and methylmagnesium methylsulphate. By alcalimetric determination, the active methyl radicals are determined, and by magnesium determination, for instance by the gravimetric method with ammonium magnesium phosphate, the total magnesium content of the clear solution is found. Since dimethylmagnesium has two methyl radicals attached to a magnesium atom, and methylmagnesium methylsulphate has a single hydrolysable methyl radical attached to the magnesium atom, it is possible to calculate the respective proportions of the two constituents.

It is found that these proportions vary with temperature and time, and that the lower the reaction temperature the more methylmagnesium methylsulphate there is in the mixture. By operating, for instance at 18–20° C. and using diethyleneglycol diethyl ether as a solvent, the proportion of methylmagnesium methylsulphate may be as much as 87% for 13% of dimethylmagnesium.

For practical purposes, however, it is not important to have a preponderance of one or other constituents since each of them acts as a Grignard reagent and evolves either one or two methyl radicals.

The magnesium solutions can be used for Grignard reactions as obtained, without isolating the magnesium derivatives. The magnesium methylsulphate precipitate, usually not heavy, does not hinder the reaction in most cases. If desired, it can be eliminated by decantation or filtration in an inert atmosphere.

The products obtained are extremely useful for Grignard reactions (double decomposition and addition) and give very good yields.

The following examples illustrate the invention.

*Example I*

The reaction is carried out in a 750 cc. round-bottomed flask fitted with a water cooling-jacket, a dropping funnel and a nitrogen inlet pipe. This round-bottomed flask is also provided with a system of mechanical stirring and an outlet tap allowing the reaction mixture to be drawn off by gravity. The flask is charged with 5.3 g. of magnesium, and a solution of 2 g. of dimethyl sulphate in 15 g. of tetrahydrofuran. The atmosphere of the flask is purged with dry nitrogen and the temperature brought to about 20° C. by running cold water in the jacket. An iodine crystal weighing about 0.1 g. is then introduced. The reaction immediately commences which is shown by a slight rise in temperature and in feeble evolution of gas. After standing until the iodine coloration of the medium has entirely disappeared, the mixture is diluted with 85 g. of tetrahydrofuran, agitated, and a solution of 23.2 g. of dimethyl sulphate in 71 g. of tetrahydrofuran is added drop-by-drop while the temperature is maintained at about 18° C.

During the operation, the mixture becomes gradually turbid and about 250 cc. of gas is evolved. When all the dimethyl sulphate and tetrahydrofuran has been poured in, the suspension is drawn off and filtered under nitrogen, the temperature being kept below 20° C.

0.5 gram of unreacted magnesium is recovered which indicates that the amount transformed is very close to the theoretical quantity.

Calculations on the basis hereinbefore indicated show: (a) that 95% of the magnesium has combined as organomagnesium compound and (b) that the organomagnesium compounds are in the following proportions:

$CH_3MgSO_4CH_3$ : 66%

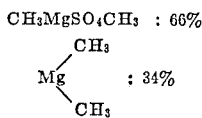
: 34%

Example II

A similar apparatus to that used in the preceding example, except that the round-bottomed flask only has a capacity of 250 cc., and is charged with 2.85 g. magnesium (an excess of about 25%) and a solution of 1 g. of dimethyl sulphate in 10 g. of tetrahydropyran. The mixture is cooled to bring the temperature below 20° C. An iodine crystal weighing 0.03 g. is placed on the magnesium and the atmosphere of the flask is purged with nitrogen. The reaction starts immediately. When the brown colour of the solution due to the iodine has completely disappeared, which requires about 15 minutes, the agitation is started and a solution of 10.2 g. of dimethyl sulphate in 68 g. of tetrahydropyran is added drop-by-drop over a period of 3¼ hours, the temperature of the reaction mixture being kept between 18° and 19° C. It is agitated another 15 minutes after the addition of the solution is complete.

Finally, 1 g. of unreacted magnesium is recovered.

Calculations show that: (a) 86% of the magnesium has combined as organomagnesium compound and (b) the organomagnesium compounds are in the following proportions:

$CH_3MgSO_4CH_3$ : 60%

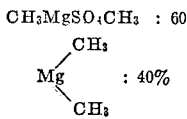
: 40%

Example III

A round-bottomed flask is charged with 1.35 g. of magnesium (i.e. 0.056 g. atom) which is covered with 10 g. of diethyleneglycol diethyl ether containing in solution 0.3 g. of dimethyl sulphate, followed by an iodine crystal. The reaction starts soon after the iodine has been introduced. 5.7 g. of dimethyl sulphate in 39 g. of diethyleneglycol diethyl ether are gradually added over 1 hour 40 minutes the temperature being maintained at 18–20° C. There has thus been used 6 g. (0.0476 g. mole) of dimethyl sulphate. 0.2 g. of unreacted magnesium is recovered.

Calculations show that: (a) the yield is 80% based on the dimethyl sulphate used and (b) the organomagnesium compounds are in the following proportions:

$CH_3MgSO_4CH_3$ : 87%

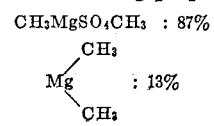
: 13%

We claim:
1. A process for the production of methylmagnesium compounds which comprises reacting, under substantially anhydrous conditions, dimethyl sulphate with magnesium, at a low temperature, in a solvent selected from the group consisting of tetrahydrofuran, tetrahydropyran, and homologues thereof, and polyethylene glycol ethers of the general formula:

$$R(OCH_2CH_2)_nOR'$$

wherein R and R' represent alkyl groups, and n is an integer.

2. A process for the production of methylmagnesium compounds which comprises reacting, under substantially anhydrous conditions, dimethyl sulphate with magnesium, at a low temperature, in a solvent selected from the group consisting of polyethylene glycol ethers of the general formula:

$$R(OCH_2CH_2)_nOR'$$

wherein R and R' are both alkyl groups of not more than 4 carbon atoms and n is selected from the group consisting of 2 and 3.

3. A process for the production of methylmagnesium compounds which comprises reacting dimethyl sulphate with magnesium in diethyleneglycol diethyl ether, at a temperature of less than 25° C. under substantially anhydrous conditions.

4. A process for the production of methylmagnesium compounds which comprises reacting dimethyl sulphate with magnesium, in diethyleneglycol dibutylether, at a temperature of less than 25° C. under substantially anhydrous conditions.

5. A process for the production of methylmagnesium compounds which comprises reacting dimethyl sulphate with magnesium in tetrahydrofuran, at a temperature of less than 25° C. under substantially anhydrous conditions.

6. A process for the production of methylmagnesium compounds which comprises reacting dimethyl sulphate with magnesium in tetrahydropyran, at a temperature of less than 25° C. under substantially anhydrous conditions.

7. A process for the production of methylmagnesium compounds which comprises reacting dimethyl sulphate with magnesium in 2-methyl-tetrahydrofuran, at a temperature of less than 25° C. under substantially anhydrous conditions.

8. A process for the production of methylmagnesium compounds which comprises reacting, under substantially anhydrous conditions, dimethyl sulphate with magnesium, at a temperature below 25° C., in a solvent selected from the group consisting of tetrahydrofuran, tetrahydropyran, and homologues thereof, and polyethylene glycol ethers of the general formula:

$$R(OCH_2CH_2)_nOR'$$

wherein R and R' represent groups, and n is an integer.

9. A process according to claim 8 when carried out at a temperature of from 18° to 20° C.

References Cited in the file of this patent

UNITED STATES PATENTS

| | | |
|---|---|---|
| 2,108,213 | Scott et al. | Feb. 15, 1938 |
| 2,464,751 | Richter | Mar. 15, 1949 |
| 2,552,676 | Hill | May 15, 1951 |
| 2,838,508 | Ramsden | June 10, 1958 |

OTHER REFERENCES

Suter et al.: Journal of the American Chemical Society, volume 57 (1935), pages 107–109 relied on.